(12) United States Patent
Lee et al.

(10) Patent No.: US 7,870,397 B2
(45) Date of Patent: Jan. 11, 2011

(54) METHOD AND APPARATUS FOR MANAGING DIGITAL RIGHTS OF PORTABLE STORAGE DEVICE

(75) Inventors: Byung-rae Lee, Yongin-si (KR);
Kyung-im Jung, Seongnam-si (KR);
Joong-chul Yoon, Seoul (KR);
Moon-sang Kwon, Seoul (KR);
Shin-han Kim, Seoul (KR); Jae-jin Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1173 days.

(21) Appl. No.: 10/969,907

(22) Filed: Oct. 22, 2004

(65) Prior Publication Data

US 2005/0091508 A1 Apr. 28, 2005

Related U.S. Application Data

(60) Provisional application No. 60/512,927, filed on Oct. 22, 2003.

(30) Foreign Application Priority Data

Oct. 22, 2003 (KR) .................. 10-2003-0073963
Jul. 16, 2004 (KR) .................. 10-2004-0055653

(51) Int. Cl.
*G06F 11/30* (2006.01)
*G03F 12/14* (2006.01)

(52) U.S. Cl. ..................... 713/193; 380/270

(58) Field of Classification Search ............ 380/270, 380/277; 713/168, 176, 193
See application file for complete search history.

(56) References Cited

U.S. PATENT DOCUMENTS

| | | | |
|---|---|---|---|
| 7,185,145 B2 * | 2/2007 | Mizushima et al. | 711/115 |
| 2002/0013772 A1 * | 1/2002 | Peinado | 705/51 |
| 2002/0019935 A1 * | 2/2002 | Andrew et al. | 713/165 |
| 2002/0069308 A1 * | 6/2002 | Jones et al. | 710/5 |
| 2002/0108050 A1 * | 8/2002 | Raley et al. | 713/193 |
| 2002/0165825 A1 * | 11/2002 | Matsushima et al. | 705/51 |

(Continued)

FOREIGN PATENT DOCUMENTS

EP 1286495 A1 2/2003

(Continued)

OTHER PUBLICATIONS

Davies, D.H, DataPlay's mobile information distribution and storage technology, Mar./Apr. 2002, INSPEC, vol. 22, p. 1-8.*

(Continued)

*Primary Examiner*—Kambiz Zand
*Assistant Examiner*—Monjour Rahim
(74) *Attorney, Agent, or Firm*—Sughrue Mion, PLLC

(57) ABSTRACT

A method and apparatus for managing digital rights of a portable storage device are provided. The method comprises a device performing authentication together with the portable storage device and sharing an encryption key with the portable storage device as a result of the authentication, requesting a rights object list from the portable storage device, receiving the rights object list from the portable storage device, and processing and displaying the rights object list.

24 Claims, 17 Drawing Sheets

U.S. PATENT DOCUMENTS

| | | | |
|---|---|---|---|
| 2002/0184515 A1* | 12/2002 | Oho et al. | 713/193 |
| 2003/0007640 A1* | 1/2003 | Harada et al. | 380/270 |
| 2003/0009681 A1* | 1/2003 | Harada et al. | 713/193 |
| 2003/0014630 A1* | 1/2003 | Spencer et al. | 713/168 |
| 2003/0016826 A1* | 1/2003 | Asano et al. | 380/277 |
| 2003/0046568 A1* | 3/2003 | Riddick et al. | 713/193 |
| 2003/0120928 A1* | 6/2003 | Cato et al. | 713/176 |
| 2003/0120942 A1* | 6/2003 | Yoshida et al. | 713/193 |
| 2003/0120943 A1* | 6/2003 | Hughes | 713/193 |
| 2003/0131252 A1* | 7/2003 | Barton | 713/193 |
| 2003/0149885 A1* | 8/2003 | Fang et al. | 713/193 |
| 2003/0159037 A1* | 8/2003 | Taki et al. | 713/168 |
| 2005/0246553 A1* | 11/2005 | Nakamura et al. | 713/193 |
| 2006/0026338 A1* | 2/2006 | Ebara et al. | 711/103 |
| 2006/0062384 A1* | 3/2006 | Dondeti | 380/44 |
| 2006/0190726 A1* | 8/2006 | Brique et al. | 713/168 |
| 2006/0204003 A1* | 9/2006 | Takata et al. | 380/30 |
| 2006/0262925 A1* | 11/2006 | Matsumoto et al. | 380/28 |

FOREIGN PATENT DOCUMENTS

| | | |
|---|---|---|
| JP | 2000-113066 A | 4/2000 |
| JP | 2001-359050 A | 12/2001 |
| JP | 2002049433 A | 2/2002 |
| JP | 2002-123266 A | 4/2002 |
| JP | 2002-123700 A | 4/2002 |
| JP | 2002-203180 A | 7/2002 |
| JP | 2002-312522 A | 10/2002 |
| JP | 2002288044 A | 10/2002 |
| JP | 2003-178070 A | 6/2003 |

OTHER PUBLICATIONS

Araki S.: "The Memory Stick", IEEE Micro, IEEE Inc. New York, US, vol. 20, No. 4, Jul. 2000, pp. 40-46, XP000976111.

"Memory Stick Copyright Protection Technology-MagicGate—" Techno World, May 22, 2000, XP002309105.

* cited by examiner

LIST OF PLAYLISTS

STRUCTURE OF PLAYLIST FILE

FIG. 2

| LICENSE ENTRY NUMBER | TRANSACTION ID | ACm | | | VALID STATUS |
|---|---|---|---|---|---|
| | | PLAYBACK COUNT | MOVE COUNT | SECURITY LEVEL | |
| 0 | TR_03615 | 5 | 3 | HIGH | |
| ⋮ | ⋮ | ⋮ | ⋮ | ⋮ | |
| N-1 | TR_15796 | 3 | 3 | LOW | |

FIG. 5

INPUT COMMAND

| CLA | INS | P1 | P2 | Lc | Data Field | Le |
|-----|-----|----|----|----|------------|-----|
| 00  | 76  | 02 | 01 | 00 | None       | FF |

INPUT PARAMETERS

| P1 | P2 | Description |
|----|----|-------------|
| 02 | 01 | -P1 : COMMAND TO ACQUIRE RO LIST<br>-P2 : BRINGING AVAILABLE RO INFORMATION |

| | | Description |
|---|---|---|
| Lc | | 00 |
| Date Field | T | None |
|  | L | None |
|  | V | None |
| Le | | FF |

OUTPUT RESPONSE

| Data field | Description |
|------------|-------------|
| T | 0x76 |
| L | LENGTH OF V FIELD |
| V | RO_LIST_INFO |

FIG. 6

| CID<br>(Content Identifier) | Ctype<br>(Content Type) | RID<br>(Right Object Identifier) | PERMISSION |
|---|---|---|---|
| ... | ... | ... | ... |

FIG. 9

INPUT COMMAND

| CLA | INS | P1 | P2 | Lc | Data Field | Le |
|---|---|---|---|---|---|---|
| 00 | 76 | 01 | 01 | FF | TLV | 00 |

INPUT PARAMETERS

| P1 | P2 | Description |
|---|---|---|
| 01 | 01 | -P1 : COMMAND TO ACQUIRE RO INFORMATION<br>-P2 : SETTING CID |

| | | Description |
|---|---|---|
| Lc | | FF |
| Date Field | T | 0x76 |
| | L | LENGTH OF V FIELD |
| | V | CID |
| Le | | 00 |

OUTPUT RESPONSE

| Data field | Description |
|---|---|
| T | None |
| L | None |
| V | None |

| Status Word | | Description |
|---|---|---|
| 6A | 83 | CONTENT SEARCH FAILS |
| 66 | 03 | RO SEARCH FAILS |

FIG. 10

INPUT COMMAND

| CLA | INS | P1 | P2 | Lc | Data Field | Le |
|-----|-----|----|----|-----|------------|-----|
| 00  | 76  | 01 | 02 | 00  | None       | FF  |

INPUT PARAMETERS

| P1 | P2 | Description |
|----|----|-------------|
| 01 | 02 | -P1 : COMMAND TO ACQUIRE RO INFORMATION<br>-P2 : BRINGING RO INFORMATION |

|  |  | Description |
|--|--|-------------|
| Lc | | 00 |
| Date Field | T | None |
| | L | None |
| | V | None |
| Le | | FF |

OUTPUT RESPONSE

| Data field | Description |
|------------|-------------|
| T | 0x76 |
| L | LENGTH OF V FIELD |
| V | E(K, RO_INFO) |

FIG. 13

INPUT COMMAND

| CLA | INS | P1 | P2 | Lc | Data Field | Le |
|---|---|---|---|---|---|---|
| 00 | 76 | 03 | 01 | FF | TLV | 00 |

INPUT PARAMETERS

| P1 | P2 | Description |
|---|---|---|
| 03 | 01 | -P1 : COMMAND TO DELETE RO<br>-P2 : SETTING RO DELETION |

| | | Description |
|---|---|---|
| Lc | | FF |
| Date Field | T | 0x76 |
| | L | LENGTH OF V FIELD |
| | V | RID |
| Le | | 00 |

OUTPUT RESPONSE

| Data field | Description |
|---|---|
| T | None |
| L | None |
| V | None |

US 7,870,397 B2

METHOD AND APPARATUS FOR MANAGING DIGITAL RIGHTS OF PORTABLE STORAGE DEVICE

CROSS-REFERENCE TO RELATED APPLICATIONS

This application claims the priorities from Korean Patent Application Nos. 10-2003-0073963 and 10-2004-0055653 filed on Oct. 22, 2003 and Jul. 16, 2004, respectively, with the Korean Intellectual Property Office, and U.S. Provisional Patent Application No. 60/512,927 filed on Oct. 22, 2003 with the United States Patent and Trademark Office, the disclosures of which are incorporated herein in their entireties by reference.

BACKGROUND OF THE INVENTION

1. Field of the Invention

The present invention relates to a method and apparatus for managing digital rights of a portable storage device.

2. Description of the Related Art

Recently, digital rights management (DRM) has been actively researched and developed. Commercial services using DRM have already been used or will be used. DRM needs to be used because of the following various characteristics of digital content. Unlike analog data, digital content can be copied without loss and can be easily reused, processed, and distributed, but a large amount of cost, labor, and time are needed to produce the digital content. When the digital content is copied and distributed without permission, a producer of the digital content may lose his/her profit, and his/her enthusiasm for creation may be discouraged. As a result, development of digital content business may be hampered.

There have been several efforts to protect digital content. Conventionally, digital content protection has been concentrated on preventing non-permitted access to digital content, and permitting only people who have paid charges to access the digital content. However, when a person who has paid charges intentionally distributes the digital content to other people, these other people can use the digital content without paying charges. To solve this program, DRM was introduced. In DRM, any one is allowed to freely access encoded digital content, but a license referred to as a rights object is needed to decode and execute the digital content. Accordingly, the digital content can be more effectively protected by using DRM.

A portable storage device is a connectable/disconnectable device such as a portable phone, a computer, or a digital camera which can store data of various types of digital equipment and is portable. The portable storage device includes a storage space for storing data and a portion performing an operation and control. A multimedia card (MMC) is a portable storage device and stores multimedia data to be used for various types of digital equipment, overcoming limitations of conventional hard disks or compact disks. The MMC also includes an operation part that is not included in conventional storage media, thereby having the ability to perform control. As a result, the MMC is suitable to accommodate various kinds of multimedia data in large capacities. Recently, a security function was added to the MMC, thereby developing a secure MMC that secures digital content during storage and transmission and protects copyright. With the development of the secure MMC, rights management on digital content becomes possible in a storage device and digital equipment. Hereinafter, digital equipment such as a digital camera, a portable phone, a computer, and a digital camcorder will be generally referred to as a "device".

In recent DRM technology, content and a right of using the content are separately transferred. The content is encoded when it is transferred, and the right is needed to use the content. Accordingly, secured custody and management of the right is important. To securely transfer the right, a secure MMC provided with a copy protection or DRM feature is used. According to conventional DRM, independent information regarding the right is not provided to a user, but the user is examined on information regarding the right when the user is about to use the content. Hereinafter, a user means a person possessing a device having a DRM function, and a right means a rights object itemizing a right to play content.

FIGS. 1A and 1B illustrate an example of a structure of a rights object for a secure digital (SD) card, a conventional portable storage device. FIG. 1A illustrates a relation between playlists of audio files. A playlist indicates a single audio file, which may exist at a plurality of tracks in the SD card. To let a user know information on the playlists, a procedure of reading and showing information regarding the playlists is needed. In other words, a storage area of a memory card is accessed to read a file regarding a playlist, and a type of license with respect to particular content can be identified based on the read file. The file has a structure as shown in FIG. 1B.

Referring to FIG. 1B, in the SD card, a title key manager file for audio files is defined as AOBSA1.KEY and includes key information and rights information that are used to decode the audio files existing in a user area of the SD card. POBSP1.KEY denotes a title key manager file for pictures and also includes key information and rights information used to decode the pictures existing in the user area of the SD card. In other words, the title key manager file AOBSA1.KEY includes key information and rights information regarding all of the audio files existing in the user area, and the title key manager file POBSP1.KEY includes key information and rights information regarding all of the picture files existing in the user area.

In the above-described conventional structure, a device needs to directly access a file system of a memory card. Accordingly, the device needs an ability to analyze the file system of the memory card. In addition, part of the memory card is occupied to form and maintain the file structure. Moreover, the memory card is burdened with management of playlists, and a user cannot be supported for convenient playlist configuration.

Such memory cards are suited to applications using a playlist, and therefore, they cannot provide a command providing information regarding a license, i.e., a rights object, existing in the memory cards and regarding content linked to the license and existing the memory cards. Here, the memory cards provide a function that allows track information to be provided through a playlist. However, in this case, playlist management is needed. Since the structure of an SD card is based on a model in which content and a license are transferred together, it is difficult to apply this structure to a DRM model in which a license and content are separately transferred.

FIG. 2 illustrates an example of a structure of a license for a conventional content protection (CP) secure MMC. In the CP secure MMC, rights information is included in a license control area, and Access Control media (ACm) performs access control with respect to media.

A license includes identification information, a transaction identifier (ID), and information regarding access control. A playback count indicates a right to play content based on the license. A move count indicates the number of times that the license can be moved to another device or another storage medium.

Secure MMCs using copy protection or rights management include Memory Sticks made by Sony, SanDisks made by Panasonic, Secure Digital Cards made by Toshiba, and The Content Protection Secure MMC System Specification made by Multimedia Memory Card Association (MMCA). However, they do not consider users' convenience in terms of rights management. In other words, no secure MMCs show kinds of rights stored therein. Accordingly, a user cannot check whether he/she has a right to content until the content in the user's secure MMC is played and cannot prepare appropriate content in advance. In addition, when the secure MMC does not have enough memory to keep a right, when the right is expired, or when the user does not want to use the right any more, there are no methods of easily erasing the right according to the user's selection.

As for an SD card, rights information is divided into only audio, video, and pictures, and a user cannot obtain information regarding his/her rights. As for a CP secure MMC, even a divider for distinguishing audio from video does not exist, and a user cannot obtain information regarding his/her rights, either.

Accordingly, a method of obtaining information regarding a user's right in the user's DRM secure MMC regardless of existence or non-existence of content, obtaining necessary content according to the information, and erasing the right according to the user's selection, thereby allowing the user to manage his/her right, is desired.

SUMMARY OF THE INVENTION

Illustrative, non-limiting embodiments of the present invention overcome the above disadvantages, and other disadvantages not described above.

An apparatus and method consistent with the present invention manages information on a rights object stored in a portable storage device.

The present invention is also provided to allow a user to delete a rights object when the rights object is not needed any more or when a storage capacity of a portable storage device is deficient.

According to an aspect of the present invention, there is provided a method of managing digital rights of a portable storage device, including performing authentication together with the portable storage device and sharing an encryption key with the portable storage device as a result of the authentication, requesting a rights object list from the portable storage device, receiving the rights object list from the portable storage device, and processing and displaying the rights object list.

BRIEF DESCRIPTION OF THE DRAWINGS

The above and other features and advantages of the present invention will become more apparent by describing in detail preferred embodiments thereof with reference to the attached drawings in which:

FIG. 2 illustrates an example of a structure of a license for a conventional content protection (CP) secure multimedia card (MMC);

FIG. 5 illustrates a structure of a command for obtaining the rights object list according to an embodiment of the present invention;

FIG. 6 illustrates a structure of the rights object list according to an embodiment of the present invention;

FIG. 9 illustrates a structure of a command for obtaining the rights object regarding the particular content identifier according to an embodiment of the present invention;

FIG. 10 illustrates a structure of a command for obtaining information on a particular rights object according to an embodiment of the present invention;

FIG. 13 illustrates a structure of a command for deleting a rights object according to an embodiment of the present invention;

DETAILED DESCRIPTION OF THE INVENTION

Figure 1A:
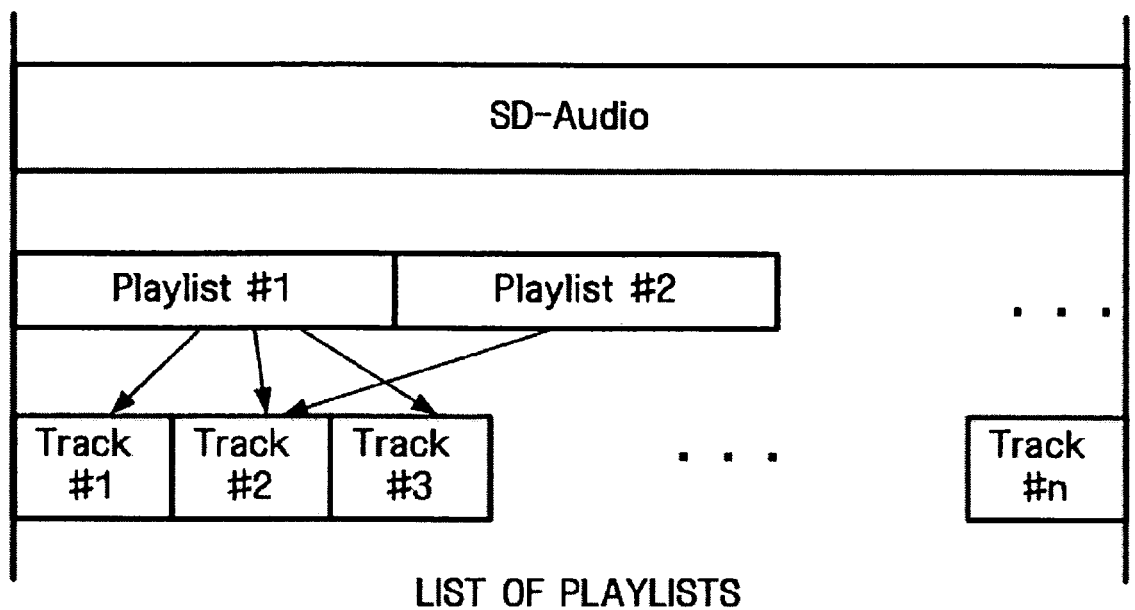
FIGS. 1A and 1B illustrate an example of a structure of a rights object for a secure digital (SD) card, a conventional portable storage device.
Figure 1B:
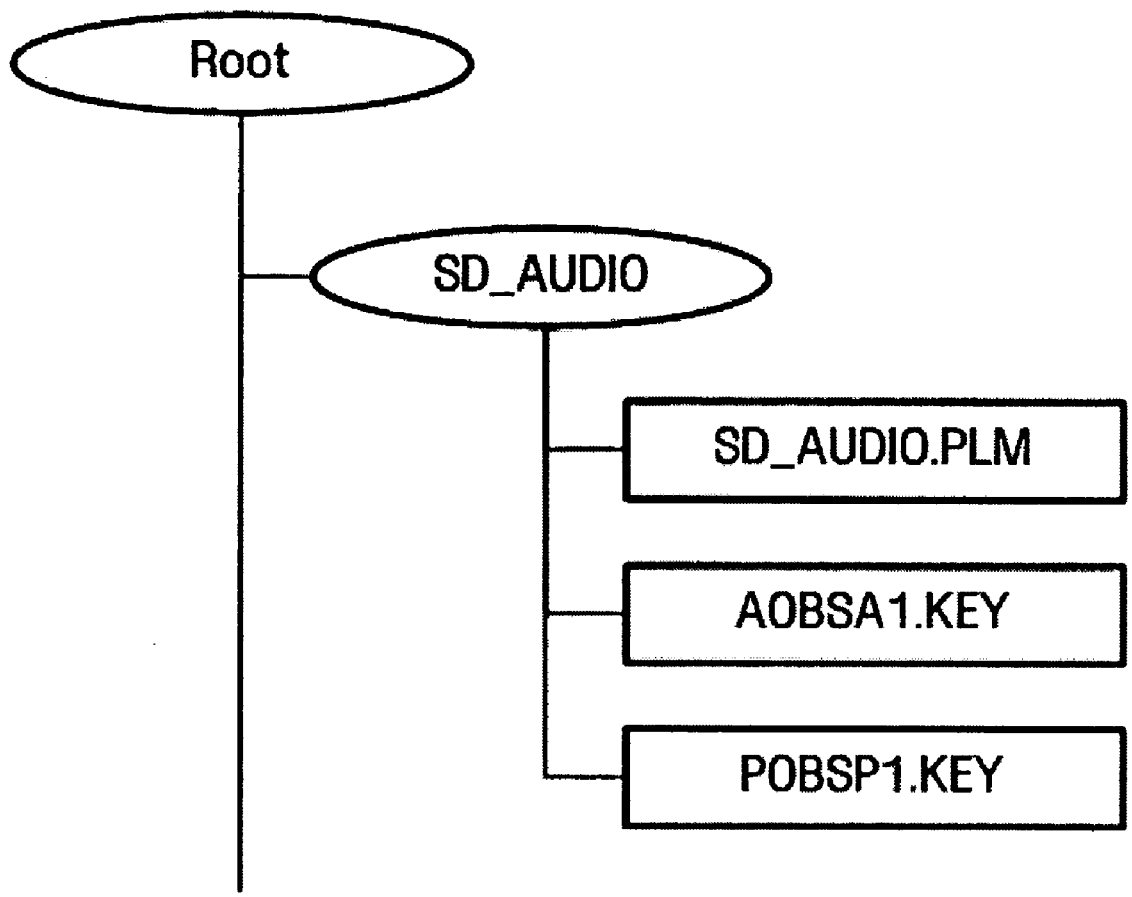

A description of major items used in the present invention will be set forth below.

User, Content Provider, and License Provider

A user means a person who possesses a device having a digital rights management (DRM) function. A content provider means an organization distributing content. A license provider (LP) means an organization selling and delivering a license corresponding to the content.

License

A license means an object itemizing a right to play content and is referred to as a rights object.

Portable Storage Device

A portable storage device is a connectable/disconnectable device such as a portable phone, a computer, or a digital camera which can store data of various types of digital equipment and is portable. The portable storage device includes a storage space for storing data and a portion performing an operation and control. A multimedia card (MMC) is the portable storage device and stores multimedia data to be used for various types of digital equipment, overcoming limitations of conventional hard disks or compact disks. The MMC also includes an operation part that is not included in conventional storage media, thereby having the ability to perform control. As a result, the MMC is suitable to accommodate various kinds of multimedia data in large capacities. Recently, a security function is added to the MMC, thereby developing a secure MMC that secures digital content during storage and transmission and protects copyright. With the development of the secure MMC, rights management on digital content becomes possible in a storage device and digital equipment. Embodiments of the present invention will be described based on a secure MMC, but the present invention is not restricted thereto and relates to a portable storage device.

Mobile Device

A mobile device means digital equipment such as a portable phone, a computer, or a digital camera that is portable and mobile. Recently, with an increasing demand on mobility of a device, portable and mobile digital equipment has been researched and developed a lot. Hereinafter, the digital equipment including a digital camera, a portable phone, a computer, and a digital camcorder is generally referred to as a mobile device.

Meanwhile, a portable storage device can also be used for other devices having a computing function that plays, moves, copies, or prints multimedia content as well as a mobile device. Accordingly, a device or a mobile device used in the embodiments of the present invention can use content stored in a portable storage device such as a secure MMC and can move or copy content using the portable storage device.

Rights and Rights Object (RO)

Rights are identical with licenses. The rights include items about access to or use of content and can be transferred or sold independently of the content. A rights object means an object having rights information and can be independently moved and copied in DRM service. The rights object may include rights information regarding particular content or rights information regarding content belonging to a particular group or an individual. Since the rights object includes information for controlling access to content, it is encoded when it is transmitted.

Encoding and Decoding

For transmission between a portable storage device and a device, a license and information are encoded in order to prevent data from being illegally revealed or modified during the transmission. In an embodiment of the present invention, an encryption key is used for encoding and decoding. When data or rights object is encoded using a key referred to as a "K" and transmitted, a device and a portable storage device that have "K" receive and decode the data, store the decoded data or rights object in their storage part, and perform a function requested by the data.

Symmetric Key Algorithm

A symmetric key algorithm uses a single key for encoding and decoding. The single key is engaged or defined in advance by an encoding party and a decoding party.

In the embodiments of the present invention described below, a "unit", "part" or a "module" indicates a software component or a hardware component such as a field-programmable gate array (FPGA) or an application-specific integrated circuit (ASIC). The unit performs a particular function but is not restricted to software and hardware. The unit may be included in an addressable storage medium or may be configured to play one or more processors. Accordingly, units may include components such as software components, object-oriented software components, class components, and task components, processes, functions, attributes, procedures, subroutines, segments of a program code, drivers, firmware, microcodes, circuits, data, databases, data structures, tables, arrays, and parameters. Components and features provided by units may be combined into a smaller number of components and a smaller number of units, or may be divided into a greater number of components and a greater number of units. In addition, components and units may be implemented such that they play one or more central processing units (CPUs) in a device or a secure MMC.

Hereinafter, preferred embodiments of the present invention will be described in detail with reference to the attached drawings.

Figure 3:
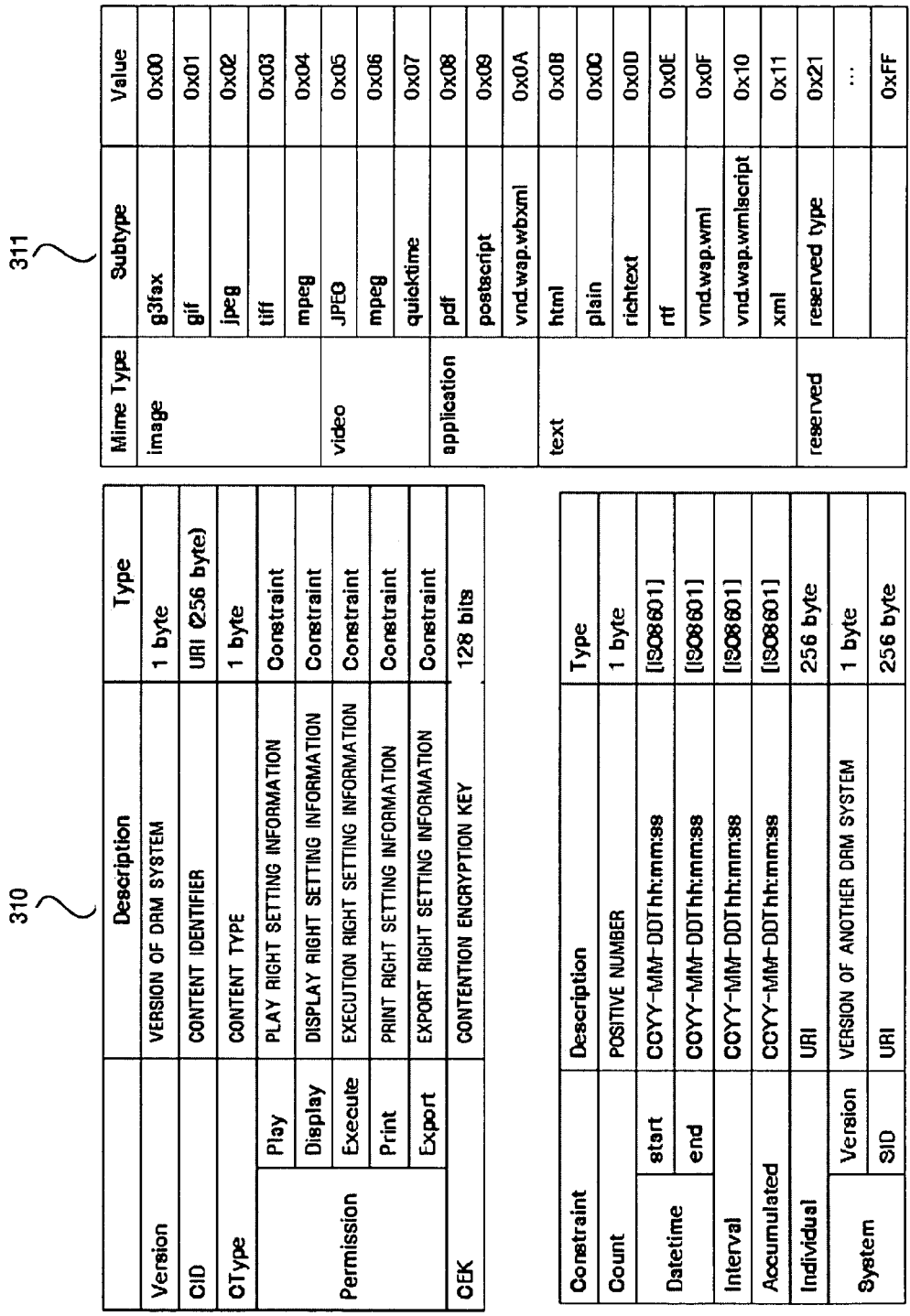
FIG. 3 illustrates a structure of a rights object according to an embodiment of the present invention.

FIG. 3 illustrates a structure of a rights object according to an embodiment of the present invention. The rights object existing at a restricted area in a secure MMC includes information on a right to use content and information on a type of content corresponding to the right. A content type may have a value identifying audio, video, game, or pictures and may be subdivided to indicate a particular content format.

Information 310 constituting a rights object includes items: a Version, a Content Identifier (CID), a Content Type (CType), a Permission, and Constraints. The Version indicates a version of DRM service. The CID indicates an identifier of content regarding which rights object has rights information. The CType indicates a type of content designated by the CID, for example, video, audio, or pictures. In other words, the CType defines a media type of content to be protected using DRM. The CType is 1 byte in length and may have values shown in Table 311 of FIG. 3. Values 0x00 through 0x11 define subtypes of the content types, image, video, application, text, etc. Values 0x21 through 0xFF are reserved for extension afterward. Content types may include application, audio, image, message, model, multipart, text, video, etc. These content types are by way of example and do not limit exemplary embodiments of the present invention.

The Permission includes information on how rights such as Play, Display, Execute, Print, Export, etc. to content are set.

A Play item indicates a right to represent DRM content in the form of audio/video. If any constraint is specified on the Play item, playback is performed according to the constraint. However, if no constraints are specified, playback is performed without limitations.

A Display item indicates a right to represent DRM content on a visual device. An Execute item indicates a right to execute DRM content such as Java games or other application programs. A Print item indicates a right to generate a hard copy of DRM content such as images like JPEG images.

An Export item indicates a right to export rights objects corresponding to DRM content to another DRM system or another content protection structure.

The Export item necessarily has constraints that specify DRM systems or content protection structures to which the DRM content and rights objects can be sent. The Export item has two modes: a move mode and a copy mode. In the move mode, a rights object is deactivated in a current DRM system when it is transmitted to another system. However, in the copy mode, the rights object is not deactivated in the current DRM system.

The detailed structure of a constraint specified on the Permission is shown in Table 312 of FIG. 3. Constraints on permission limit consumption of digital content.

A Count constraint has a positive integer value and specifies the number of times of permission given to content. A Datetime constraint specifies a time limit of the permission and optionally includes a start item and an end item. When the start item is specified, access is not permitted before a particular time on a particular date. When the end item is specified, access is not permitted after a particular time on a particular date.

An Interval constraint specifies a duration for which a right is effective on DRM content. When the start item is specified, consumption of DRM content is permitted during a period of time specified by the Interval constraint after a particular time on a particular date. When the end item is specified, consumption of DRM content is permitted during a period of time specified by the Interval constraint before a particular time on a particular date.

An Accumulated constraint specifies a maximum measured time for which a right can be performed on DRM content. A DRM agent does not permit access to DRM content after an accumulated time specified by a value of the Accumulated constraint has lapsed.

An Individual constraint specifies an individual who can use content. A System constraint specifies a DRM system or a content protection structure to which content and a rights object can be transmitted. A Version item indicates version information of the DRM system or the content protection structure. A SID item indicates a name of the DRM system or the content protection structure.

Figure 4A:
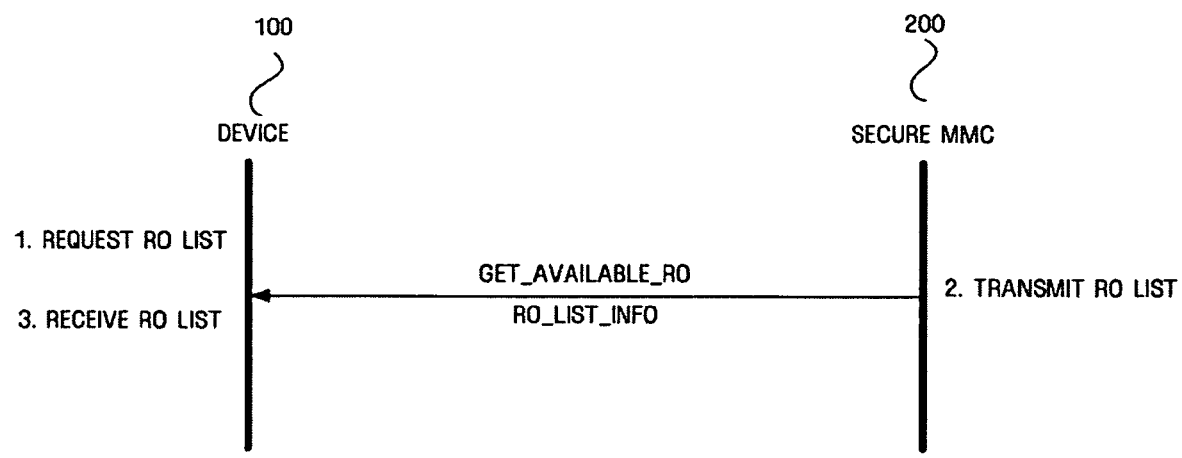
FIGS. 4A through 4C are flowcharts illustrating a procedure of obtaining a rights object list according to an embodiment of the present invention.
Figure 4B:
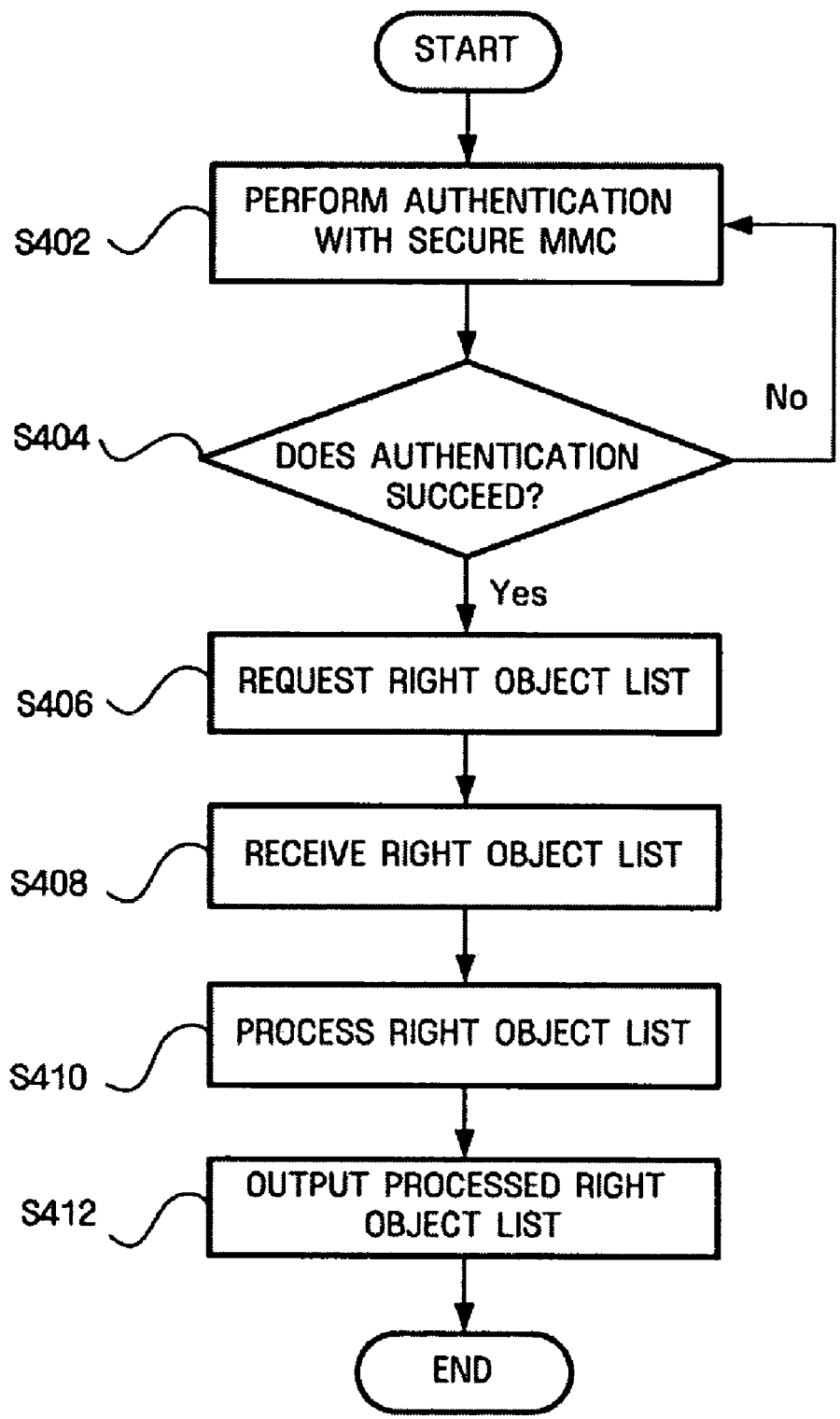
Figure 4C:
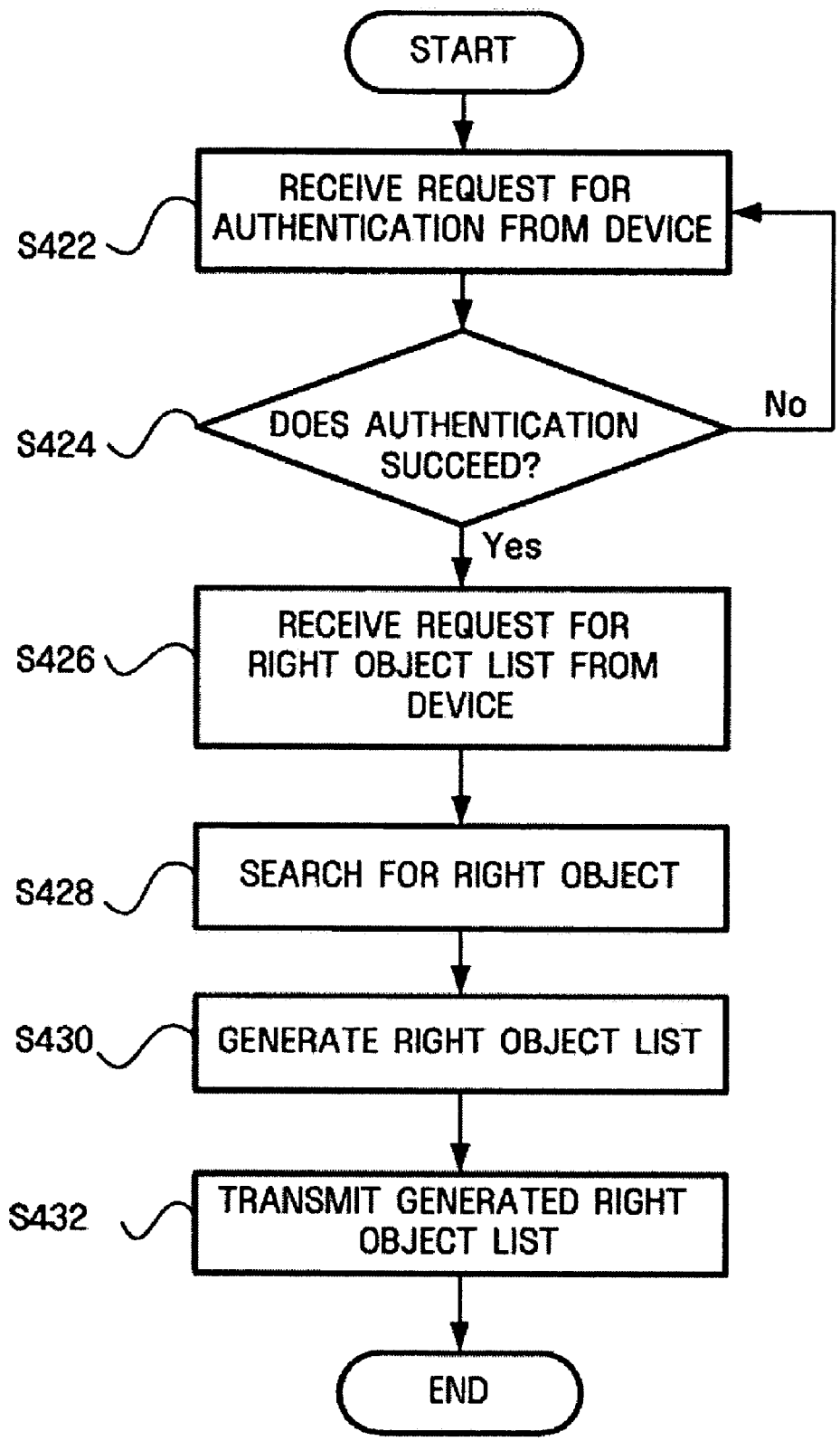

FIGS. 4A through 4C are flowcharts illustrating a procedure of obtaining a rights object (RO) list according to an embodiment of the present invention. FIG. 4A is a flowchart illustrating interactions between a device 100 and a secure MMC 200. The device 100 and the secure MMC 200 mutually perform authentication. The device 100 transmits a user's selection to the secure MMC 200. The secure MMC 200 is a portable storage device having a DRM function.

After mutual authentication between the device 100 and the secure MMC 200, the user sends a command, GET_AVAILABLE_RO, requesting a list of ROs with respect to a particular content type to the secure MMC 200 through the device 100. Then, the secure MMC 200 sends the requested RO list, RO_LIST_INFO, to the device 100. As a result, the user can obtain information on the ROs possessed by the secure MMC 200 over the particular content type. However, an encryption key used when content is encoded is not provided to the user. The user can also bring a list of rights to all content types not just to a particular content type.

FIG. 4B is a flowchart of a procedure in which the device 100 performs authentication and requests an RO list. The device 100 performs mutual authentication with the secure MMC 200 in operation S402. When the authentication succeeds in operation S404, the device 100 requests the secure MMC 200 to transmit a list of ROs possessed by the secure MMC 200 in operation S406. When the authentication fails, the authentication can be performed again. During the authentication, the device 100 and the secure MMC 200 may share an encryption key which can be used for later encoding data transmitted therebetween in order to prevent the data from being lost or altered. The device 100 receives the RO list from the secure MMC 200 in operation S408. The RO list is not transmitted in a systemized directory or file structure but is transmitted in a form of a list including RO information. Accordingly, the received RO list is processed for displaying in operation S410. The device 100 outputs the processed RO list in operation S412 so that the user can confirm the RO information.

FIG. 4C is a flowchart of a procedure in which the secure MMC 200 processes authentication and a request for an RO list. When the secure MMC 200 receives a request to perform authentication from the device 100 in operation S422, it performs operations to generate, for example, an encryption key, and exchanges information needed for the authentication with the device 100. When the authentication succeeds in operation S424, data can be transmitted between the device 100 and the secure MMC 200. The secure MMC 200 receives a request for an RO list from the authenticated device 100 in operation S426. In response to the request, the secure MMC 200 searches for ROs in operation S428. When the device 100 requests an RO list corresponding to particular conditions, the secure MMC 200 needs to search for ROs satisfying the particular conditions. The secure MMC 200 generates an RO list using information on the searched ROs in operation S422. The RO list may be encoded using the encryption key generated during the authentication. The secure MMC 200 transmits the generated RO list to the device 100 in operation S432. Then, the device 100 receives and processes the RO list.

FIG. 5 illustrates a structure of a command for obtaining an RO list according to an embodiment of the present invention. An input command includes input parameters P1 and P2 that request a secure MMC to transmit an RO list to a device. In response to a request made by the input parameters P1 and P2, the secure MMC transmits the RO list over an output response. The RO list is embedded into a V field in a data field of the output response. The RO list may include a content identifier, a content type, and permission information.

FIG. 6 illustrates a structure of an RO list according to an embodiment of the present invention. When a secure MMC receives a command requesting information on ROs satisfying particular conditions, such as ROs for a particular content type or all ROs existing in the secure MMC, it transmits a list of ROs satisfying the particular conditions. The RO list may include a CID indicating a unique identifier of content, an RO identifier (RID) identifying each of ROs on the list, and a Permission given to each RO. When information on all of the ROs existing in the secure MMC is requested, the RO list may also include a CType indicating a content type supported by each RO. RO_LIST_INFO includes the CID, the RID, and the Permission with respect to a device.

Figure 7:
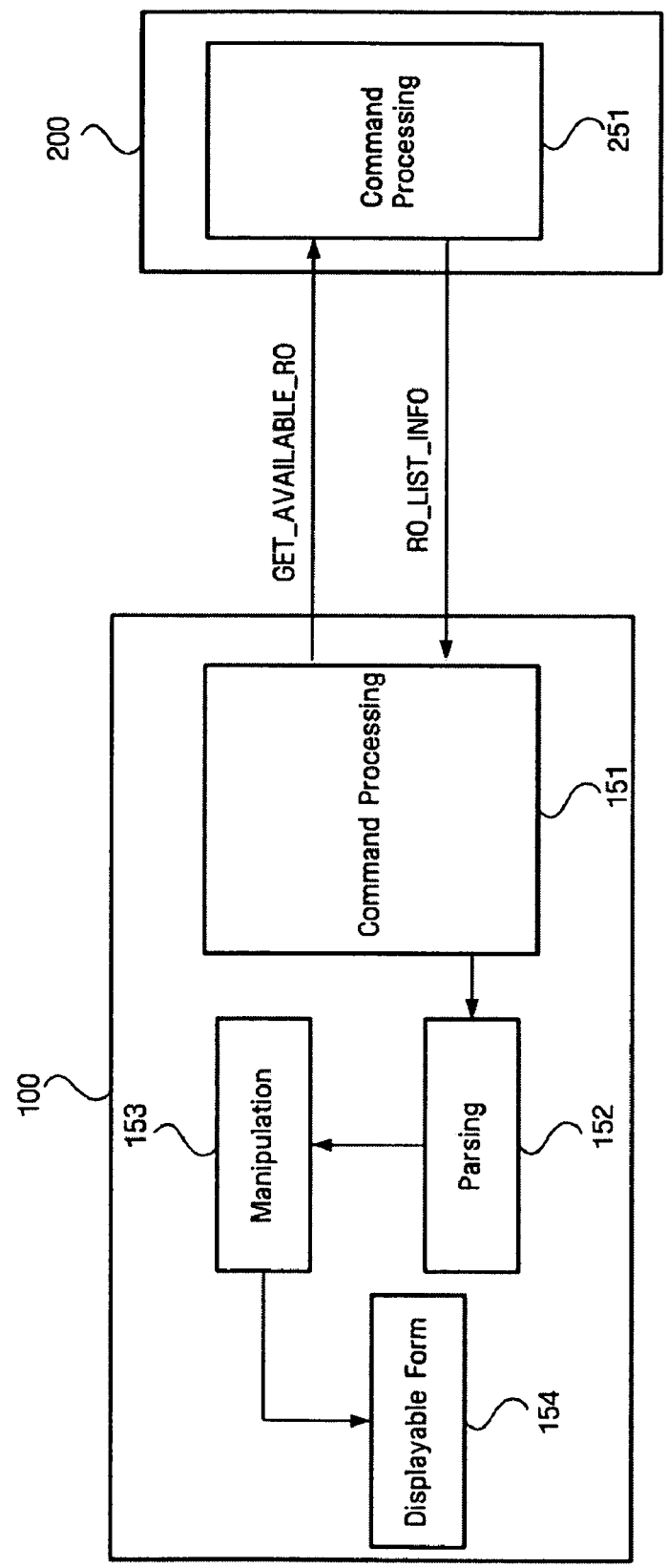
FIG. 7 is a block diagram illustrating a procedure of processing a command according to an embodiment of the present invention.

FIG. 7 is a block diagram illustrating a procedure of processing a command according to an embodiment of the present invention. A device 100 and a secure MMC 200 include command processors 151 and 251, respectively. An input command, generated by the device 100 and an output response, generated by the secure MMC 200 are transmitted between the command processors 151 and 251. The device 100 parses the received rights object 152. Parsing is an operation of dividing the rights object including the RID, the CID, and the Permission in a predetermined text or file format into information items for display. The parsed data is manipulated 153 into a displayable form 154. For example, to show a play right set in the Permission, the data is converted into a displayable form referred to as "PLAY" using a value of a field indicating playback. Since information such as the Constraint and the CType shown in FIG. 3 can be composed of using a hexadecimal number or a binary number, the information needs to be changed into a form that a user can easily recognize.

Figure 8:
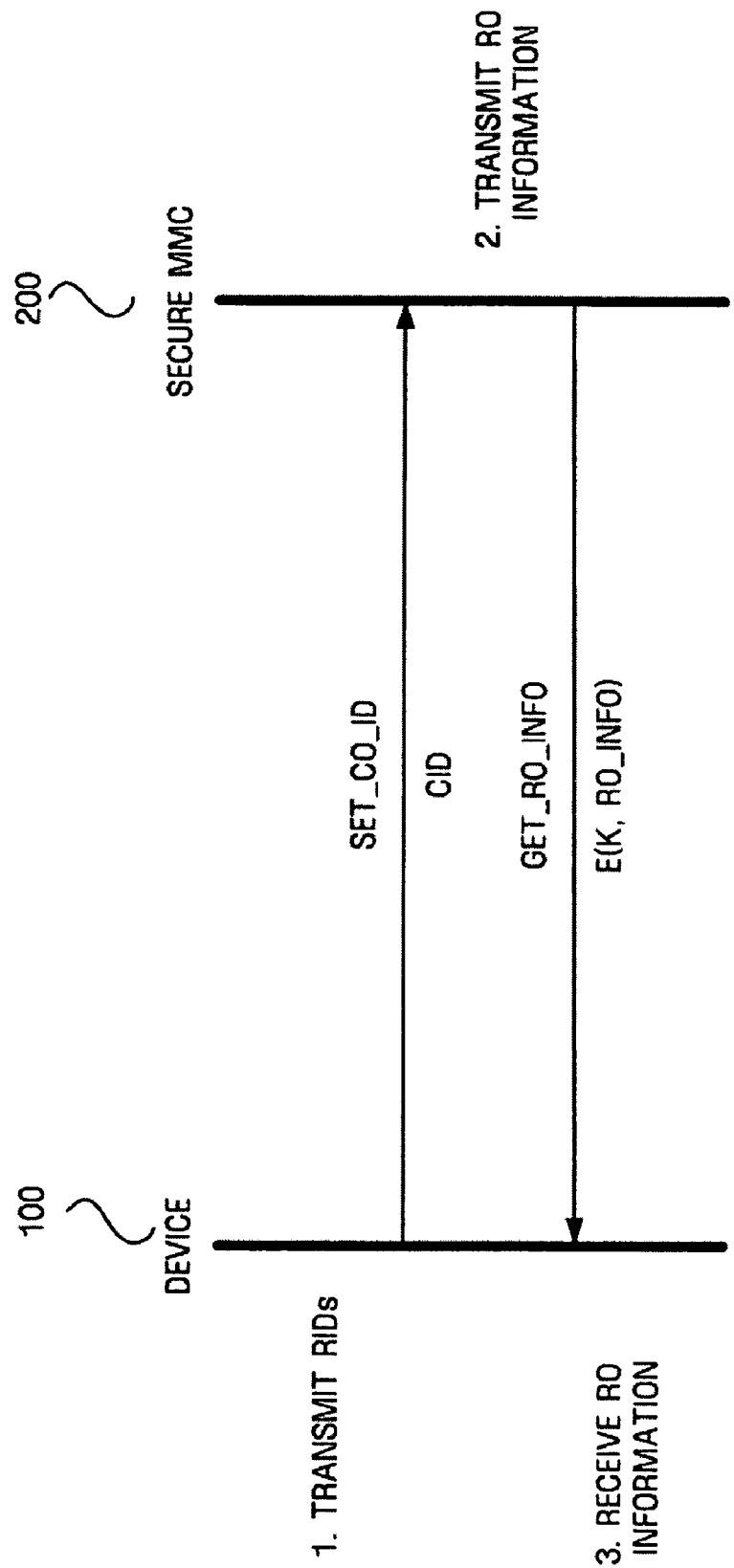
FIG. 8 is a flowchart of a procedure of obtaining a rights object regarding a particular content identifier according to an embodiment of the present invention.

FIG. 8 is a flowchart of a procedure of obtaining an RO regarding a particular CID according to an embodiment of the present invention. When a user wants to bring rights information regarding a particular CType or acquire information regarding an RO corresponding to a CID that the user knows, a device 100 performs mutual authentication with a secure MMC 200 and transmits the CID or an RID to the secure MMC 200 so that the user can obtain desired information. Here, an encryption key used to encode the content is not provided to the user.

The encryption key is generated by combining random numbers generated by the device 100 and the secure MMC 200 during an authentication procedure. In detail, a random number generated by the device 100 is transmitted to the secure MMC 200 and is combined with a random number generated by the secure MMC 200, thereby generating an encryption key used to encode data transmitted between the device 100 and the secure MMC 200.

The device 100 requests information on particular content from the secure MMC 200 using a command, SET_CO_ID. The command SET_CO_ID includes a field containing a CID specifying content. The CID is an identifier identifying DRM content and includes a value of a content uniform resource identifier (URI).

The device 100 transmits an RID or CID to the secure MMC 200 to obtain information on an RO or content. Then, the secure MMC 200 searches for RO information corresponding to the RID or the CID and transmits the RO information to the device 100 using a command, GET_RO_INFO. Here, the RO information is encoded using an encryption key referred to as a "K". The K indicates the encryption key generated during the authentication procedure.

FIG. 9 illustrates a structure of a command for obtaining an RO regarding a particular CID according to an embodiment of the present invention. This command is an embodiment of SET_CO_ID presented at FIG. 8. In an input command, input parameters include a parameter P1 commanding to acquire RO information and a parameter P2 setting a CID. A data field includes the CID. In response to the input command, a status word reporting an error is output as an output response when an RO regarding the particular content or a desired RO is not present.

FIG. 10 illustrates a structure of a command for obtaining information on a particular RO according to an embodiment of the present invention. In response to an input command from the device 100, the secure MMC 200 transmits information on particular content to the device 100 using the command GET_RO_INFO. Input parameters of the input command may include P1 and P2 the same as those set in the command SET_CO_ID. The device 100 receives information on the particular RO stored in the secure MMC 200 through an output response having a V field. The information on the particular RO is contained in the V field. The command GET_RO_INFO includes the V field containing E(K, RO_INFO) from which information on the particular content or RO can be obtained. The RO information contained in the V field is encoded using the encryption key and then transmitted to the device 100. The device 100 can use the RO information after decoding it.

Figure 11:
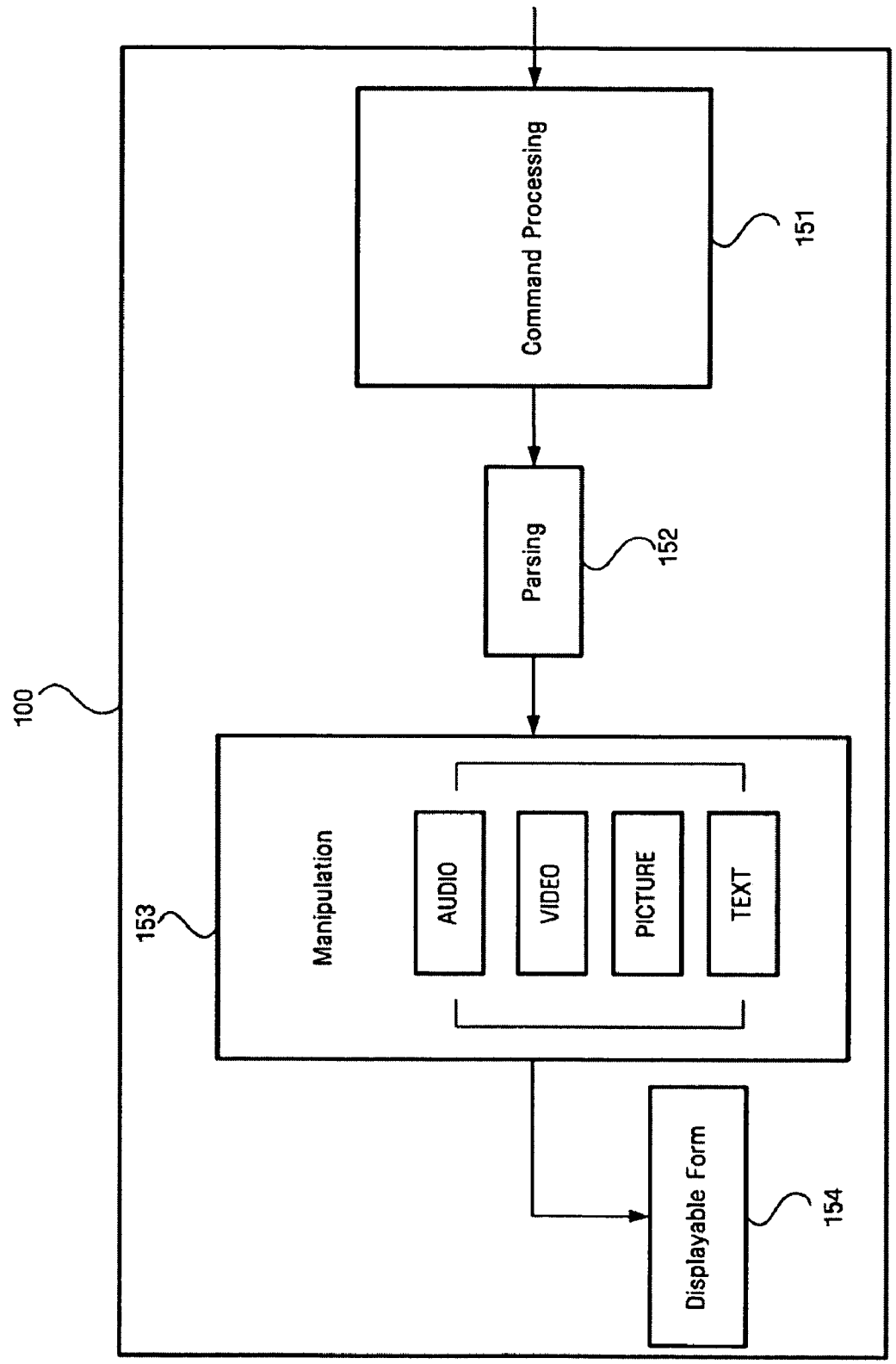
FIG. 11 is a block diagram illustrating a procedure of outputting information on a rights object according to an embodiment of the present invention.

FIG. 11 is a block diagram illustrating a procedure of outputting RO information according to an embodiment of the present invention. Specifically, FIG. 11 shows relation among elements of a device 100 receiving an RO list or RO information from a secure MMC and processing the RO list or the RO information. Command Processing 151 extracts information from a V field of an output response included in received command. Since the extracted information is in a form suitable to a machine, it is divided into appropriate information items and re-assembled into a predetermined format in a parsing operation 152. The re-assembled information may be divided into audio, video, pictures, and text in a manipulation operation 153. The manipulated information is converted into a displayable form in operation 154.

Figure 12:
FIG. 12 is a flowchart of a procedure of deleting a rights object according to an embodiment of the present invention.

FIG. 12 is a flowchart of a procedure of deleting an RO according to an embodiment of the present invention. An RID or a CID may be set as a parameter of a command, SET_DELETE_RO to command a secure MMC 200 to delete an RO. The secure MMC 200 receives an RID or CID to be deleted from a device 100 and deletes an RO corresponding to the RID or CID.

FIG. 13 illustrates a structure of a command for deleting an RO according to an embodiment of the present invention. To delete a particular RO, an RID indicating the particular RO needs to be transmitted to a secure MMC. Accordingly, an input parameter P1 is set to command deletion and an input parameter P2 is set to delete an RO. An RID of the RO to be deleted is set in a V field in a data field to be transmitted to the secure MMC. An input command including the input parameters and the data field is transmitted to the secure MMC. Then, the secure MMC deletes the RO corresponding to the RID set in the V field.

Figure 14:
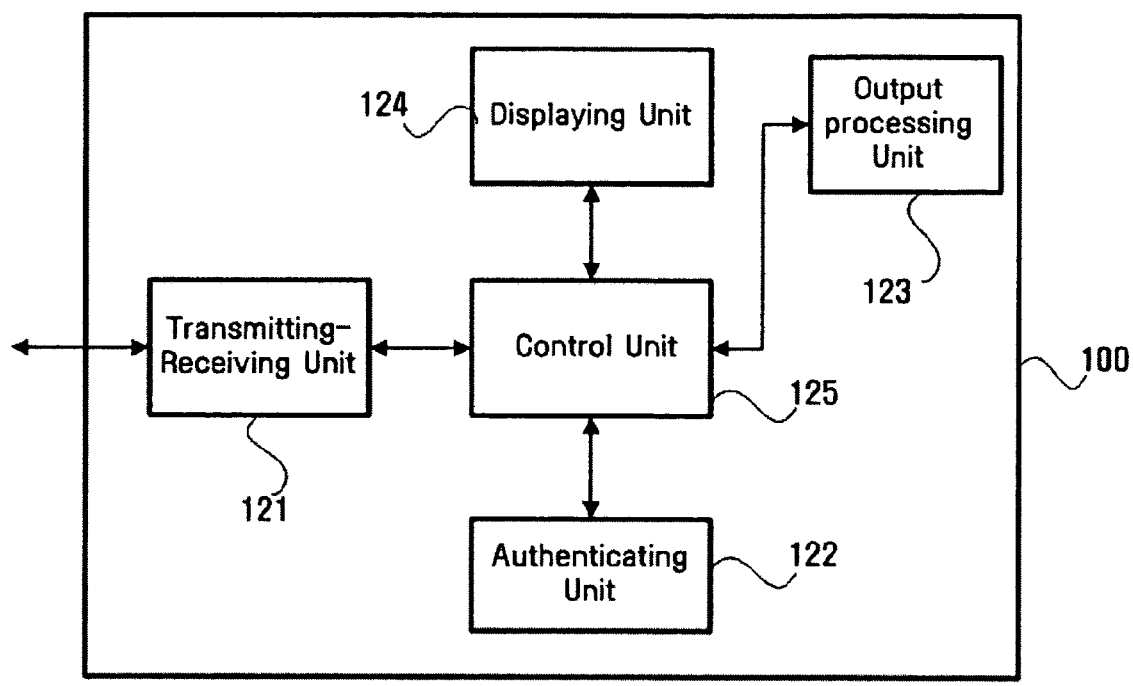
FIG. 14 is a block diagram of a device according to an embodiment of the present invention.

FIG. 14 is a block diagram of a device 100 according to an embodiment of the present invention. The device 100 includes a transmitting-receiving unit 121 exchanging information with a portable storage device. The transmitting-receiving unit 121 may exchange information with other devices not a portable storage device. The device 100 needs an authenticating unit 122 performing authentication. The authenticating unit 122 performs coding and decoding and may generate an encryption key shared with the portable storage device. In detail, the authenticating unit 122 decodes data received through the transmitting-receiving unit 121 and encodes an RO to be transmitted to the portable storage device.

Although an RO list received through the transmitting-receiving unit 121 is decoded by the authenticating unit 122, the decoded RO list is not appropriate to display. In particular, to show ROs on the RO list in a desired form or by types according to a user's request, a function converting and processing the RO list is required. An output processing unit 123 parses the RO list and works to output the RO list in a form, e.g., by content types or by times, defined by the user. The parsing operation 152 and the manipulation operation 153 shown in FIGS. 7 and 11 are performed by the output processing unit 123. The RO list converted into a displayable form can be recognized by the user through a displaying unit 124, performs data flow, operations, and control among the transmitting-receiving unit 121, the authenticating unit 122, the output processing unit 123, and the displaying unit 124.

Figure 15:
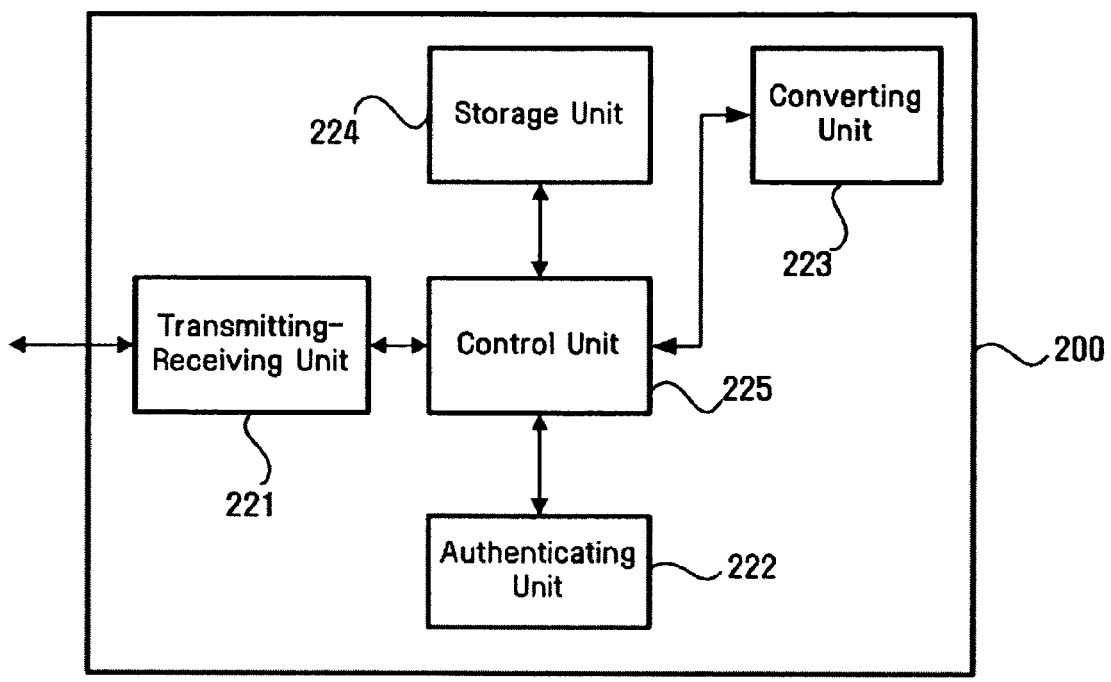
FIG. 15 is a block diagram of a portable storage device according to an embodiment of the present invention.

FIG. 15 is a block diagram of a portable storage device 200 according to an embodiment of the present invention. The portable storage device 200 includes a transmitting-receiving unit 221 exchanging information with a device. The transmitting-receiving unit 221 receives a command and an RO from the device and transmits an RO stored in the portable storage device 200.

The portable storage device 200 also includes an authenticating unit 222 performing authentication together with the device. The authenticating unit 222 performs coding and decoding and may generate an encryption key shared with the device. In detail, the authenticating unit 122 decodes data received through the transmitting-receiving unit 221 and encodes an RO to be transmitted to the device.

A converting unit 223 converts an RO that has been received through the transmitting-receiving unit 221 and decoded by the authenticating unit 222 into a file format supported by the portable storage device 200. During the conversion performed by the converting unit 223, the RO may be encoded according to a predetermined cryptography used in the portable storage device 200. To transmit the encoded RO to the device, the encoded RO may be decoded again.

A storage unit 224 stores an RO converted by the converting unit 223. A control unit 225 performs data flow, operations, and control among the other units. In addition, the control unit 225 may process a command received from the device and generate a control signal to control each unit to operate according to the command. The command processing operation 251 shown in FIG. 7 is performed by the control unit 225.

It will be understood by those of ordinary skill in the art that various changes in form and details may be made therein without departing from the spirit and scope of the present invention as defined by the following claims. Therefore, it is to be appreciated that the above described embodiment is for purposes of illustration only and not to be construed as a limitation of the invention. The scope of the invention is given by the appended claims, rather than the preceding description, and all variations and equivalents which fall within the range of the claims are intended to be embraced therein.

According to the present invention, a user can obtain information on an RO stored in a portable storage device. According to the present invention, the user can obtain information on an RO regarding a particular content type and can manage the RO stored in the portable storage device.

What is claimed is:

1. A method of managing digital rights of a portable storage device, the method comprising:
   a device performing authentication together with the portable storage device, wherein the authentication comprises generating an encryption key shared by the device and the portable storage device;
   the device requesting a rights object list from the portable storage device;
   the device receiving the rights object list from the portable storage device; and
   the device processing and displaying the rights object list,
   wherein the rights object list includes a content identifier, information on at least one rights object available at the device among rights objects stored in the portable storage device, a rights object identifier corresponding to the at least one rights object, and permission information corresponding to the at least one rights object, and
   wherein the permission information includes an Export item, and the Export item has a move mode which makes a rights object deactivated in a digital rights management system when the rights object is transmitted to another digital rights management system and a copy mode which keeps the rights object activated in the digital rights management system.

2. The method of claim 1, further comprising decoding the rights object list using the encryption key after receiving the rights object list.

3. The method of claim 1, wherein the requesting comprises requesting a rights object list corresponding to a particular content type.

4. The method of claim 1, wherein the processing and displaying comprises classifying rights objects on the rights object list according to a content type and displaying the rights object list according to a result of the classification.

5. The method of claim 1, wherein a random number generated by the device is transmitted to the portable storage device and is combined with a random number generated by the portable storage device.

6. A method of managing digital rights of a portable storage device, the method comprising:
   the portable storage device performing authentication together with a device, wherein the authentication comprises generating an encryption key shared by the device and the portable storage device; and
   the portable storage device transmitting to the device an object list that includes a content identifier, information on at least one rights object available at the device among rights objects stored in the portable storage device, a rights object identifier corresponding to the at least one rights object, and permission information corresponding to the at least one rights object,
   wherein the permission information includes an Export item, and the Export item has a move mode which makes a rights object deactivated in a digital rights management system when the rights object is transmitted to another digital rights management system and a copy mode which keeps the rights object activated in the digital rights management system.

7. The method of claim 6, further comprising encoding the rights object list using the encryption key prior to transmitting the rights object list.

8. The method of claim 6, further comprising searching for a rights object corresponding to the device's request before transmitting the list.

9. A method of managing digital rights of a portable storage device, the method comprising:
   a device performing authentication together with the portable storage device, wherein the authentication comprises generating an encryption key shared by the device and the portable storage device; and
   the device requesting the portable storage device to delete a rights object,
   wherein the rights object includes a content identifier, information on at least one rights object available at the device among rights objects stored in the portable storage device, a rights object identifier corresponding to the at least one rights object, and permission information corresponding to the at least one rights object, and
   wherein the permission information includes an Export item, and the Export item has a move mode which makes a rights object deactivated in a digital rights management system when the rights object is transmitted to another digital rights management system and a copy mode which keeps the rights object activated in the digital rights management system.

10. The method of claim 9, wherein the requesting comprises encoding information comprising an identifier of the rights object using the encryption key and transmitting the encoded information.

11. A method of managing digital rights of a portable storage device, the method comprising:
    the portable storage device performing authentication together with a device, wherein the authentication comprises generating an encryption key shared by the device and the portable storage device, and the device requesting a rights object list from the portable storage device;
    the device receiving the rights object list from the portable storage device; and
    the portable storage device deleting a rights object when the device requests to delete the rights object in the rights object list,
    wherein the rights object list includes a content identifier, information on at least one rights object available at the device among rights objects stored in the portable storage device, and permission information corresponding to the at least one rights object, and
    wherein the permission information includes an Export item, and the Export item has a move mode which makes a rights object deactivated in a digital rights management system when the rights object is transmitted to another digital rights management system and a copy mode which keeps the rights object activated in the digital rights management system.

12. The method of claim 11, further comprising searching for a rights object corresponding to the device's request before deleting the rights object.

13. An apparatus for managing digital rights of a portable storage device, the apparatus comprising:
    an authenticating unit which performs encoding, decoding, and authentication together with the portable storage device, wherein the authentication comprises generating an encryption key shared by the device and the portable storage device;
    a receiving unit which receives information on a rights object from the portable storage device;

an output processing unit which converts the received information into a displayable form; and a displaying unit which displays the displayable form, wherein the information on a rights object includes a content identifier, information on at least one rights object available at the device among rights objects stored in the portable storage device, a rights object identifier corresponding to the at least one rights object, and permission information corresponding to the at least one rights object, and wherein the permission information includes an Export item, and the Export item has a move mode which makes a rights object deactivated in a digital rights management system when the rights object is transmitted to another digital rights management system and a copy mode which keeps the rights object activated in the digital rights management system.

14. The apparatus of claim 13, wherein the information on the rights object comprises a rights object list.

15. The apparatus of claim 13, wherein the information on the rights object comprises a rights object list corresponding to a particular content type.

16. The apparatus of claim 13, wherein the authenticating unit uses an encryption key generated during the authentication when it performs the coding and the decoding according to a symmetric key algorithm.

17. A portable storage device comprising:

an authenticating unit which performs encoding, decoding, and authentication together with a device, wherein the authentication comprises generating an encryption key shared by the device and the portable storage device;

a transmitting unit which transmits information on a rights object to the device; and a storage unit which receives and stores a license of the device, wherein the authenticating unit manages digital rights, wherein the information on a rights object includes a content identifier, information on at least one rights object available at the device among rights objects stored in the portable storage device, a rights object identifier corresponding to the at least one rights object, and permission information corresponding to the at least one rights object, and wherein the permission information includes an Export item, and the Export item has a move mode which makes a rights object deactivated in a digital rights management system when the rights object is transmitted to another digital rights management system and a copy mode which keeps the rights object activated in the digital rights management system.

18. The portable storage device of claim 17, wherein the information on the rights object comprises a rights object list.

19. The portable storage device of claim 17, wherein the information on the rights object comprises a rights object list corresponding to a particular content type.

20. The portable storage device of claim 17, wherein the authenticating unit uses an encryption key generated during the authentication when it performs the coding and the decoding according to a symmetric key algorithm.

21. A digital rights management method comprising:

performing authentication together with the portable storage device, wherein the authentication comprises generating an encryption key shared by the device and the portable storage device;

requesting a rights object list corresponding to a content type desired by a user from a portable storage device, receiving the rights object list, requesting rights object information corresponding to a particular content identifier from the portable storage device based on the rights object list, and receiving the rights object information, wherein the content type can be one among audio, video, an image, an application, and text, wherein the rights object list includes a content identifier, information on at least one rights object available at the device among rights objects stored in the portable storage device, a rights object identifier corresponding to the at least one rights object, and permission information corresponding to the at least one rights object, and wherein the permission information includes an Export item, and the Export item has a move mode which makes a rights object deactivated in a digital rights management system when the rights object is transmitted to another digital rights management system and a copy mode which keeps the rights object activated in the digital rights management system.

22. The digital rights management method of claim 21, wherein when the user wants available rights object information, entire rights object information present in the portable storage device or rights object information corresponding to a particular content type is received.

23. The digital rights management method of claim 22, wherein the content identifier or a rights object identifier is obtained from the received rights object information, and rights object information corresponding to a particular content is received.

24. The digital rights management method of claim 22, wherein when a storage capacity of the portable storage device is deficient, a right is deleted from the portable storage device using either of a content identifier and a rights object identifier that are known to the user.

* * * * *